US008483877B2

(12) United States Patent
Abdallah et al.

(10) Patent No.: US 8,483,877 B2
(45) Date of Patent: Jul. 9, 2013

(54) WORKSPACE SAFE OPERATION OF A FORCE- OR IMPEDANCE-CONTROLLED ROBOT

(75) Inventors: Muhammad E. Abdallah, Houston, TX (US); Brian Hargrave, Dickenson, TX (US); John D. Yamokoski, Houston, TX (US); Philip A. Strawser, Houston, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 329 days.

(21) Appl. No.: 12/875,254

(22) Filed: Sep. 3, 2010

(65) Prior Publication Data

US 2012/0059515 A1 Mar. 8, 2012

(51) Int. Cl.
*G05B 19/18* (2006.01)
*G05B 15/00* (2006.01)
*G05B 19/00* (2006.01)

(52) U.S. Cl.
USPC ................ 700/255; 700/261; 901/2; 901/45; 901/46

(58) Field of Classification Search
USPC ................ 700/159–195, 245–264; 901/2, 9, 901/20, 28, 32, 33, 44, 46, 45; 318/280
See application file for complete search history.

(56) References Cited

U.S. PATENT DOCUMENTS 5,994,864 A 11/1999 Inoue et al.
6,298,283 B1 * 10/2001 Kato et al. .................... 700/255
(Continued)

FOREIGN PATENT DOCUMENTS

DE 102005054575 B3 4/2007
JP 04343690 A 11/1992
(Continued)

OTHER PUBLICATIONS

Nicolas Lauzier et al, "2DOF Cartesian Force Limiting Device for Safe Physical Human-Robot Interaction", 2009 IEEE International Conference on Robotics and Automation, Kobe International Conference Center, Kobe, Japan, May 12-17, 2009, pp. 253-258.*

(Continued)

*Primary Examiner* — Khoi Tran
*Assistant Examiner* — Abby Lin
(74) *Attorney, Agent, or Firm* — Quinn Law Group, PLLC

(57) ABSTRACT

A method of controlling a robotic manipulator of a force- or impedance-controlled robot within an unstructured workspace includes imposing a saturation limit on a static force applied by the manipulator to its surrounding environment, and may include determining a contact force between the manipulator and an object in the unstructured workspace, and executing a dynamic reflex when the contact force exceeds a threshold to thereby alleviate an inertial impulse not addressed by the saturation limited static force. The method may include calculating a required reflex torque to be imparted by a joint actuator to a robotic joint. A robotic system includes a robotic manipulator having an unstructured workspace and a controller that is electrically connected to the manipulator, and which controls the manipulator using force- or impedance-based commands. The controller, which is also disclosed herein, automatically imposes the saturation limit and may execute the dynamic reflex noted above.

14 Claims, 2 Drawing Sheets

U.S. PATENT DOCUMENTS

| | | | |
|---|---|---|---|
| 6,956,345 | B2 | 10/2005 | Iribe et al. |
| 7,102,311 | B2 | 9/2006 | Nishimura et al. |
| 2007/0142823 | A1 | 6/2007 | Prisco et al. |
| 2007/0255454 | A1 | 11/2007 | Dariush |
| 2008/0046122 | A1* | 2/2008 | Manzo et al. ............. 700/245 |

FOREIGN PATENT DOCUMENTS

| | | |
|---|---|---|
| JP | 6246673 A | 9/1994 |
| JP | 08118275 A | 5/1996 |
| JP | 09179632 A | 7/1997 |
| JP | 2003159674 A | 6/2003 |
| JP | 2005059161 A | 3/2005 |
| JP | 2005100143 A | 4/2005 |
| JP | 2006123012 A | 5/2006 |

OTHER PUBLICATIONS

Beong-Sang Kim et al, "Double Actuator Unit with Planetary Gear Train for a Safe Manipulator", 2007 IEEE International Conference on Robotics and Automation, Roma, Italy, Apr. 10-14, 2007, pp. 1146-1151.*

Gill A. Pratt and Matthew M. Williamson, "Series Elastic Actuators", IEEE 1995, pp. 399-406.*

Nicolas Lauzier and Clement Gosselin, "Performance Indices for Collaborative Serial Robots with Optimally Adjusted Series Clutch Actuators", Proceedings of the ASME 2010 International Design Engineering Technical Conferences & Computers and Information in Engineering Conference, Aug. 15-18, 2010.* http://robotics.nasa.gov/courses/fall2002/event/oct1/NASA_Robotics_20021001.htm.

Diftler, M.A.; Ambrose, R.O.; Tyree, K.S.; Goza, S.M.; Huber, E.L.; "A Mobile Autonomous Humanoid Assistant" In: 2004 4th IEEE/RAS International Conference on Humanoid Robots, vol. 1, pp. 133-148, Houston, Texas.

Zaier, R; Nagashima, F.; "Motion Pattern Generator and Reflex System for Humanoid Robots" In: Proceedings of the 2006 IEEE/RSJ International Conference on Intelligent Robots and Systems, Oct. 9-15, 2006, pp. 840-845, China.

Diftler, M.A.; Platt Jr, R.; Culbert, C.J.; Bluethmann, W.J.; "Evolution of the NASA/DARPA Robonaut Control System" In: Proceedings of the 2003 IEEE International Conference on Robotics & Automation, Sep. 14-19, 2003, pp. 2543-2548, Taiwan.

Albu-Schaffer, A.; Ott, C.; Hirzinger, G.; "A Unified Passivity-based Control Framework for Position, Torque and Impedance Control of Flexible Joint Robots" In: The International Journal of Robotics Research, 2007; 26, pp. 23-39, SAGE Publications, Germany.

* cited by examiner

WORKSPACE SAFE OPERATION OF A FORCE- OR IMPEDANCE-CONTROLLED ROBOT

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present invention relates to the automatic control of a force- or impedance-controlled robot in an operating environment in which a robotic manipulator of the robot may come into unexpected direct physical contact with an object and/or an operator within its workspace.

BACKGROUND

Robots are automated devices which are able to manipulate objects using a series of links. The links are interconnected by one or more actuator-driven robotic joints. Each joint in a typical robot represents at least one independent control variable, i.e., a degree of freedom. End-effectors are the particular manipulators used to perform a task at hand, such as grasping a work tool. Therefore, precise motion control of the robot by controlling its various robotic manipulators may be organized by the required level of task specification. The levels include object-level control, which describes the ability to control the behavior of an object held in a single or a cooperative grasp of the robot, end-effector control, i.e., control of the various manipulators such as robotic fingers and thumbs, and joint-level control. Collectively, the various control levels achieve the required mobility, dexterity, and work task-related functionality.

Dexterous robots may be used where a direct interaction is required with devices or systems specifically designed for human use, i.e., devices requiring human-like levels of dexterity to properly manipulate. The use of dexterous robots may also be preferred where a direct interaction is required with human operators, as the motion of the robot can be programmed to approximate human motion. Such robots are typically configured to operate in a well-defined or structured workspace. However, in certain evolving applications the designated workspace is relatively confined and/or unstructured, and may be shared with human operators. In such an operating environment there is an increased likelihood that contact will occur in the workspace between the robotic manipulator and an object and/or human operator.

SUMMARY

Accordingly, a method is disclosed herein for control of a force- or impedance-controlled dexterous robot within a robotic system. Such a robot may have one or more robotic manipulators. Each manipulator operates via a force- or impedance-based control framework within an unstructured workspace. As used herein, the terms "force-based" and "impedance-based" refer to the control of a robot relying on respective force or impedance commands and feedback signals in order to move and apply forces through the various robotic joints and manipulators of the robot.

The present method at all times automatically imposes a saturation limit on a static force/torque commanded by a given robotic manipulator to its surrounding environment. Hence, should the robotic manipulator unexpectedly contact an object in its workspace, the static force applied by the manipulator is limited or bounded. Upon contact with the object, the robotic manipulator proceeds with its assigned operating task without "fighting" through the object after the object is encountered. This phase of the present control strategy does not rely on detecting the contact, but instead uses only proprioceptive sensing as disclosed herein to limit the static force at all times.

Although the static force is bounded or saturation limited, due to momentum of the system when the robotic manipulator is in motion, the manipulator can impart a larger dynamic force at the moment of contact. Another phase of the control strategy may therefore include automatically executing a predetermined dynamic reflex upon a threshold contact force with the object. The dynamic reflex alleviates any inertial impulse of the contact that is not already addressed by the saturation-limited static force. The dynamic reflex can rely on either dynamic modeling and/or exteroceptive sensing in order to detect the contact, i.e., physically sensing the contact such that the robot receives and responds to stimuli originating from outside of its structure in order to identify the contact. In this manner the robot can reduce the inertial impact to its manipulator which otherwise is addressed only by reducing the mass and/or top speed of the manipulator.

A method is disclosed herein for controlling a force- or impedance-controlled robot having a robotic manipulator and operating within an unstructured workspace. The method includes automatically imposing a saturation limit on a static force applied by the robotic manipulator to its surrounding environment such that the static force cannot at any time exceed the saturation limit.

The saturation limit may be defined with respect to at least one of a torque in a joint of the robotic manipulator and a Cartesian force and moment at a selected point on the robotic manipulator. The method may further include determining a contact force between the robotic manipulator and an object when the robotic manipulator makes contact with the object in the unstructured workspace, and automatically executing a dynamic reflex of the manipulator when the contact force exceeds a calibrated threshold.

A robotic system as set forth herein includes a controller and a force- or impedance-controlled robot having a robotic manipulator and an unstructured workspace. The controller imposes a saturation limit on a static force applied by the manipulator to its surrounding environment such that the static force cannot at any time exceed the saturation limit.

A controller for a force- or impedance-controlled robot is also disclosed herein. The robot operates in an unstructured workspace and has a robotic manipulator. The controller includes a host machine programmed to automatically impose a saturation limit on a static force applied by the robotic manipulator to its surrounding environment, such that the static force cannot at any time exceed the saturation limit.

The above features and advantages and other features and advantages of the present invention are readily apparent from the following detailed description of the best modes for carrying out the invention when taken in connection with the accompanying drawings.

DESCRIPTION

Figure 1:
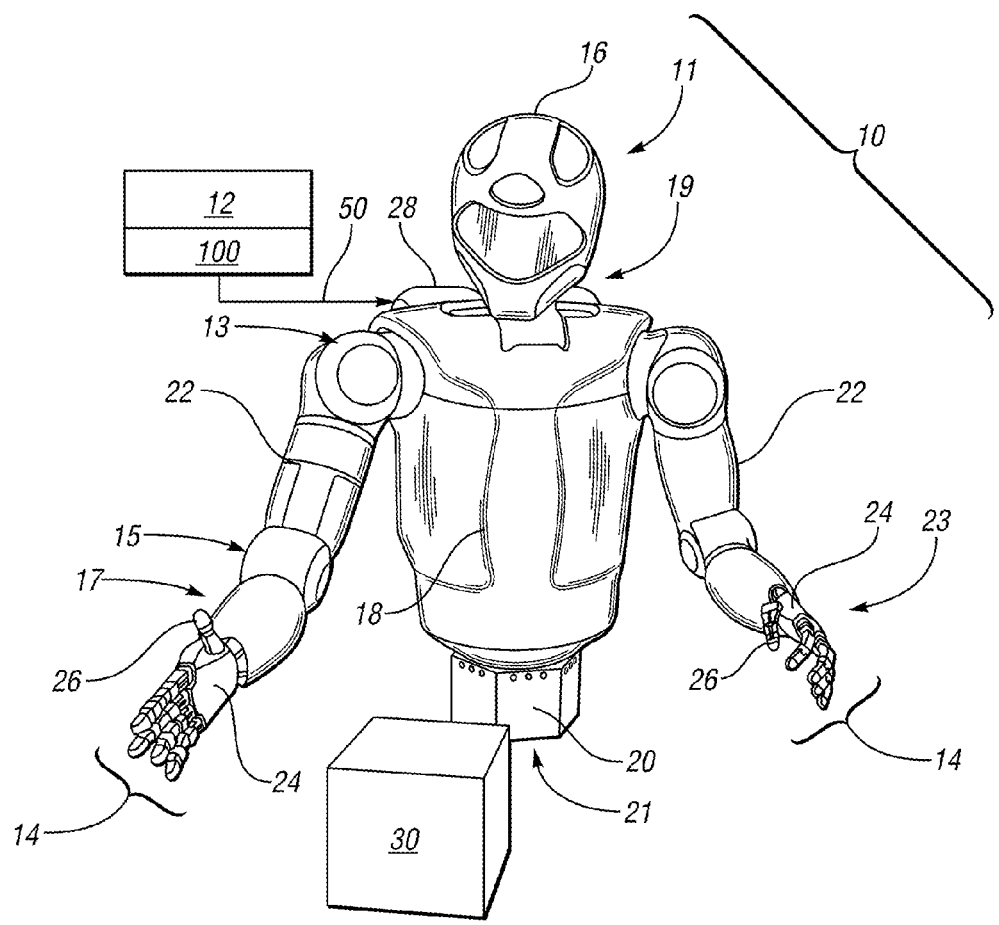
FIG. 1 is a schematic illustration of a robotic system having a force- or impedance-controlled dexterous robot with robotic manipulators controlled as disclosed herein.

With reference to the drawings, wherein like reference numbers refer to the same or similar components throughout the several views, and beginning with FIG. 1, a robotic system 10 is shown having a dexterous robot 11, shown here in a humanoid embodiment, that is controlled via an electronic control unit or controller 12. Robot 11 is controlled using force- or impedance-based commands and feedback as noted above.

Controller 12 provides a control strategy for the robot 11 using an algorithm 100 as described below with reference to FIGS. 2 and 3. The control strategy provides a static compliance phase (control phase I) at all times, and may also provide an additional dynamic reflex phase (control phase II) to help ensure the safe operation of the robot 11 within an unstructured workspace. The control phase(s) are executed by controller 12 via a joint torque command signal 50 calculated as set forth below and explained with reference to FIG. 2.

As used herein, the term "unstructured" refers to an operating environment or workspace which is at least partially undefined and/or shared with human operators or other objects, particularly where the objects/operators have an undeterminable or an unpredictable position. Such a workspace is defined in contrast to a typical structured robotic workspace having well-defined or clearly demarcated boundaries. Structured workspaces allow objects having a highly regulated position and dimensions to be present within its boundaries, but do not permit human operators to be present within these boundaries. Evolving flexible automation may entail using a robot in workspaces which are largely unstructured and/or are commonly shared with human operators, e.g., space exploration-based or industrial-based applications. In such applications, a dexterous robot can execute certain work tasks requiring human-like levels of dexterity with a changing environment.

The robot 11 of FIG. 1 may be adapted to perform automated tasks with multiple degrees of freedom (DOF), and to perform other interactive tasks or control other integrated system components, e.g., clamping, lighting, relays, etc. According to one possible embodiment, the robot 11 may have a plurality of independently- and interdependently-moveable actuator-driven robotic joints, such as but not limited to a shoulder joint, the position of which is generally indicated by arrow 13, an elbow joint that is generally (arrow 15), a wrist joint (arrow 17), a neck joint (arrow 19), and a waist joint (arrow 21), as well as the various finger joints (arrow 23) positioned between the phalanges of each robotic finger 14.

Each robotic joint may have one or more DOF. For example, certain compliant joints such as the shoulder joint (arrow 13) and the elbow joint (arrow 15) may have at least two DOF in the form of pitch and roll. Likewise, the neck joint (arrow 17) may have at least three DOF, while the waist and wrist (arrows 21 and 17, respectively) may have one or more DOF. Depending on task complexity, the robot 11 may move with over 42 DOF. Each robotic joint contains and is internally driven by one or more actuators, e.g., joint motors, linear actuators, rotary actuators, and the like.

The robot 11 may include components such as a head 16, torso 18, waist 20, arms 22, hands 24, fingers 14, and opposable thumbs 26, with the various joints noted above being disposed within or between these components. The robot 11 may also include a task-suitable fixture or base (not shown) such as legs, treads, or another moveable or fixed base depending on the particular application or intended use of the robot. A power supply 28 may be integrally mounted to the robot 11, e.g., a rechargeable battery pack carried or worn on the back of the torso 18 or another suitable energy supply, or which may be attached remotely through a tethering cable, to provide sufficient electrical energy to the various joints for movement of the same.

The controller 12 provides precise motion control of the robot 11, including control over the fine and gross movements needed for manipulating an object or work tool 30 that may be grasped by the fingers 14 and thumb 26 of one or more hands 24. The controller 12 is able to independently control each robotic joint and other integrated system components in isolation from the other joints and system components, as well as to interdependently control a number of the joints to fully coordinate the actions of the multiple joints in performing a relatively complex work task.

Still referring to FIG. 1, the controller 12 may be embodied as a server or a host machine having one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the controller 12 or readily accessible by the controller may be stored in ROM or other suitable memory and automatically executed to provide the respective control functionality.

Figure 2:
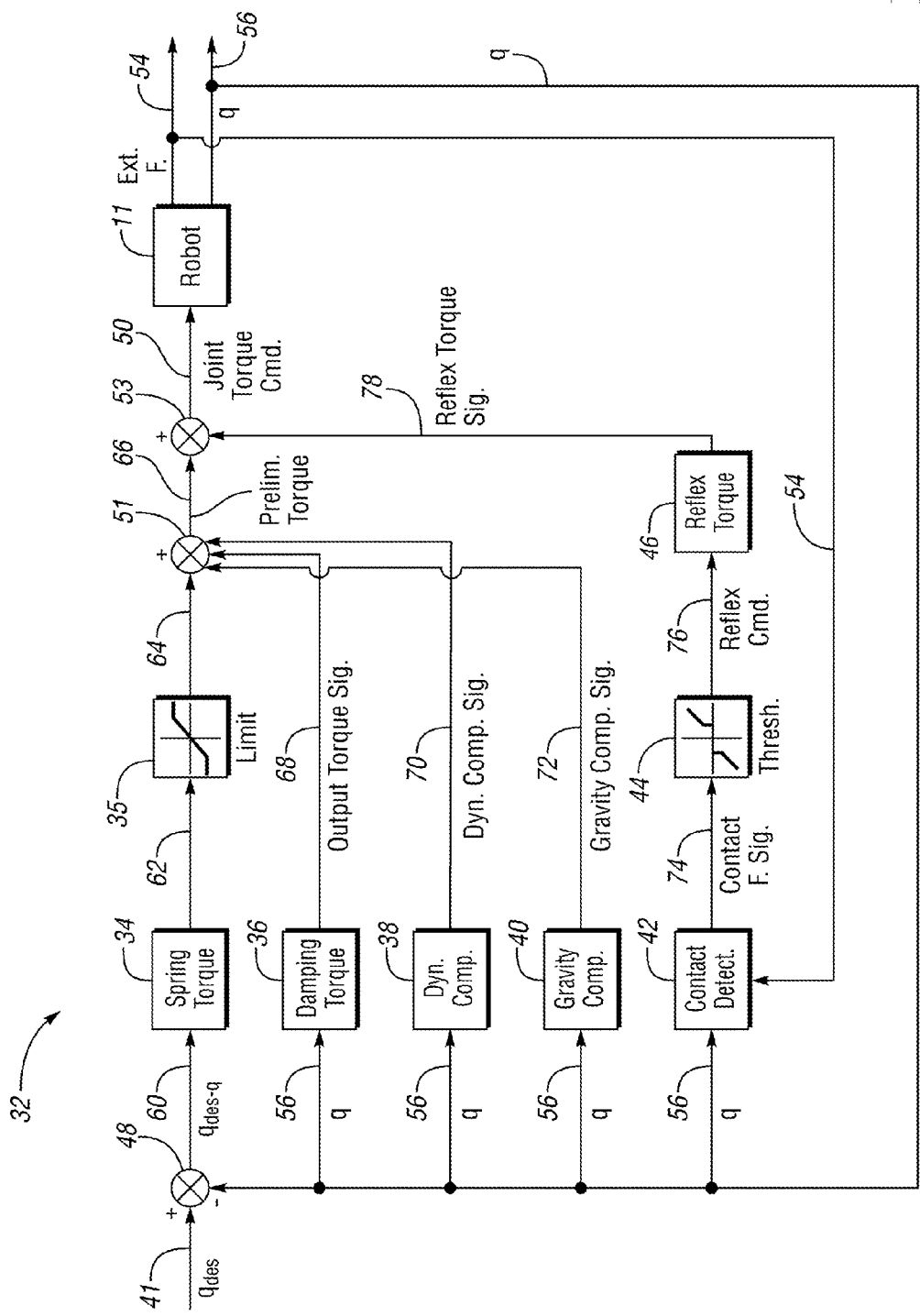
FIG. 2 is a logic control block diagram providing a control strategy for the robotic system shown in FIG. 1.

Referring to FIG. 2, a schematic control block diagram 32 describes the basic operating principles of controller 12 of FIG. 1, which as noted above provides a control strategy for static compliance (control phase I) and, if so desired, for a dynamic reflex (control phase II). That is, the robot 11 of FIG. 1 is a force- or impedance-controlled robot, and therefore its behavior may be modeled as a mass spring-damper system. One may use a force- or an impedance-based control framework to specify desired stiffness, damping, and inertial properties of the system as:

$$m\ddot{x} + b\dot{x} + k\Delta x = F$$

where k is the spring constant, m is the mass being acted upon, b is a calibrated constant, F is the applied force to the mass, and $\Delta x$ is the difference between an actual position and a desired position (x) of the mass. Force- or impedance-based control can provide robustness to a physical interaction between a robot and its surrounding environment, and provides flexibility for diverse manipulation tasks.

Block diagram 32 provides closed-loop control of the robot 11 of FIG. 1 using various logic blocks and signal processing nodes. Beginning with node 48, this particular node receives a desired joint position 41, e.g., a desired joint angle ($q_{des}$), and a measured joint position 56, e.g., a measured joint angle (q) of a given robotic joint, and calculates the difference, e.g., ($q_{des}$-q). The difference is transmitted as a position error signal 60 to a spring torque block 34, which calculates a required "spring" joint torque 62 which is proportional to the value of the position error signal 60.

The required spring joint torque 62 constitutes the static torque/force applied by a given robotic manipulator to its surrounding environment. This signal is transmitted from spring torque block 34 to a limiting block 35, which provides upper and lower bounds or saturation limits to the spring joint torque 62. Proprioceptive sensing may be used to determine force applied by the robot 11. As used herein, the term proprioceptive refers to a sensory modality providing feedback solely on the status of the robot 11 internally, i.e., a sense indicating whether the robotic is moving with a required effort, as well as where the various parts of the robot are located in relation to each other. External force sensing or detection of the contact force, i.e., exteroceptive sensing, is not required for this phase. The saturation-limited torque is transmitted as a torque signal 64 to another signal processing node 51, the function of which is described below.

Block diagram 32 also includes a damping torque block 36, a dynamic compensation block 38, a gravity compensation block 40, and a contact detection block 42. Blocks 38, 40, and 42 receive the measured joint position 56 as an input and separately generate different output signals. Damping torque block 36 receives the measured joint position 58 and provides an output torque signal 68. Signal 68 is proportional to the value Bq', where B is a calibrated proportionality constant and q' is the time derivative of the joint angle. Dynamic compensation block 38 generates a compensation signal 70 which models dynamic forces, especially the Coriolis force, and compensates as needed.

As is understood in the art, a Coriolis force is generated by the Coriolis effect acting on any object in motion in a rotating reference frame. It is proportional to the speed of rotation and of the reference frame, and to the object's speed in the same reference frame, and it acts in a direction perpendicular to the rotation axis and to the velocity of the moving body in the rotating frame. Gravity compensation block 40 models the effects of gravity acting on the robot 11, and transmits this value as gravity compensation signal 72, which is ultimately subtracted by the processing node 51.

Signal processing node 51 calculates a preliminary torque signal 66 as a function of the various signals 64, 68, 70, and 72 from the respective blocks 35, 36, 38, and 40 as described above. The preliminary torque signal 66 is fed forward to a signal processing node 53, which ultimately calculates a joint torque command signal 50 for control of the robot 11. Node 53 calculates the joint torque command signal 50 as a function of the preliminary torque signal 66 and a reflex torque signal 78 from a reflex torque block 46.

Still referring to FIG. 2, controller 12 may use contact detection block 42 to detect an external contact by modeling the dynamics of a particular robotic manipulator and/or by physically sensing an external force generated by an unexpected contact between the robot 11 and an object encountered in its unstructured workspace. Exteroceptive sensing may be used to detect such contact, with the term "exteroceptive" referring to detection of the contact force from outside of the robot 11 using such means as vision sensing, load cells, range-finding, etc. It may accept such inputs as the measured joint positions 56 and a sensed or measured external force 54, with the arrow of force 54 in FIG. 2 indicating that this value may be fed forward for use by the controller 12 as needed.

A contact force signal 74 from block 42 may be processed via a threshold comparison block 44 to generate a reflex command signal 76. When a reflex torque is required, i.e., when the external force of the contact detected at block 42 exceeds the threshold force of block 44, the reflex torque block 46 initiates a desired reflex response, which is transmitted to node 53 as the reflex torque signal 78. The actual desired reflex can take on many forms, such as generating a torque to pull back from the contact.

Node 53 then calculates the joint torque command signal 50 as a function of the preliminary joint torque 66 and the reflex torque signal 78. Robot 11 is commanded via joint torque command signal 50 to produce the required force joint torque. It may feedback any sensed or measured values for the measured external force 54 and joint position 56.

The control law as expressed in FIG. 2 is formulated in the joint-space of the robot 11 of FIG. 1, i.e., with respect to the joint degrees-of-freedom (DOF) of the robot. That is, the saturation limit described by FIG. 2 is defined with respect to at least one of a joint torque and a Cartesian force and moment at a selected point on the robotic manipulator of the robot 11. In the latter case, control may be formulated in the operational space of the robot 11, i.e., with respect to the Cartesian DOF of an end-effector of the robot. In such a case, the saturation limits apply to the Cartesian forces/moments applied by the robot 11 rather than to the joint torques.

Figure 3:
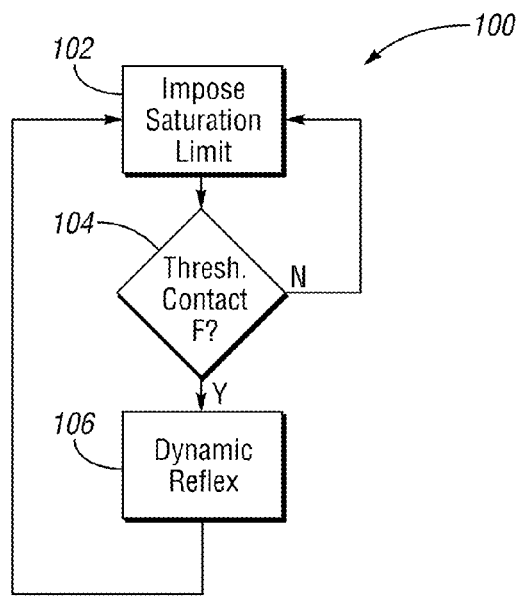
FIG. 3 is a flow chart describing a method for controlling the force- or impedance-controlled robot of FIG. 1.

Referring to FIG. 3, algorithm 100 provides one possible way of executing the control strategy set forth above. Algorithm 100 begins with step 102, wherein the controller 12 of FIG. 1 automatically imposes a saturation limit on the static force that can be applied by a given manipulator of the robot 11, i.e., by a finger, thumb, hand, or other manipulator, such that this limit cannot be exceeded at any time. In other words, the controller 12 automatically saturates the virtual "spring force" in an impedance-based framework as noted above, e.g., limiting joint torques via the saturation limit block 35 described above. The robot 11 will comply with its environment without fighting through obstacles it might happen to contact in its workspace. Step 102 provides inherent workspace safety, as it is always running and does not require contact or proximity detection.

At step 104, the controller 12 may also determine if a threshold contact force is present. For example, the contact detection block 42 of FIG. 2 may be used to detect a contact between the robot 11 and an object using modeling dynamics and/or by sensing the contact force as noted above. The comparison block 44 can be used to make the threshold decision and to communicate the decision within the controller 12 as to whether or not a dynamic reflex should be initiated.

At step 106, the controller 12 imposes a dynamic reflex on the robot 11. Due to inertia, the robot 11 will impart a higher dynamic force upon contact with an object in its workspace. If the contact force exceeds a threshold, controller 12 initiates the calibrated reflex via reflex block 46. The algorithm 100 proceeds to step 108.

At step 108, the controller 12 discontinues the dynamic reflex and switches back to only the static compliance of step 102. That is, while controller 12 continues to monitor contact in the workspace, it defaults to control phase I, i.e., static monitoring per block 34.

Using algorithm 100 when executed according to logic diagram 32 of FIG. 2, safe operation is enabled in an unstructured work environment shared between dexterous robots such as the robot 11, human operators, and any unfixtured objects. The impedance framework with the continuous static compliance ensures that compliance is always in operation, without the need for awareness of the environment. The optional dynamic reflex phase can be used to reduce the contact force occurring with fast motion of the robot 11 to within a calibrated control bandwidth.

While the best modes for carrying out the invention have been described in detail, those familiar with the art to which this invention relates will recognize various alternative designs and embodiments for practicing the invention within the scope of the appended claims.

The invention claimed is:

1. A method of controlling a force- or impedance-controlled robot having a controller and a robotic manipulator, wherein the robotic manipulator includes a robotic joint that is moveable via a joint actuator, and wherein the robot operates within an unstructured workspace, the method comprising:
- proprioceptively sensing a static force applied by the robotic manipulator to its surrounding environment;
- automatically imposing, via the controller, a saturation limit on the static force applied by the robotic manipulator to its surrounding environment at all times such that the static force cannot at any time exceed the saturation limit;
- calculating a reflex torque to be imparted by the joint actuator to the robotic joint in response to contact between the robotic manipulator and the object in the unstructured workspace;
- determining a contact force between the robotic manipulator and an object when the robotic manipulator makes contact with the object; and
- automatically applying the calculated reflex torque to the robotic joint via the joint actuator as a dynamic reflex when the contact force exceeds a calibrated threshold.

2. The method of claim 1, wherein the saturation limit is defined with respect to at least one of a torque in the robotic joint of the robotic manipulator and a Cartesian force and moment at a selected point on the robotic manipulator.

3. The method of claim 1, further comprising identifying the contact with the object using at least one of: modeling dynamics of the robotic manipulator and sensing when the contact force exceeds the calibrated threshold.

4. The method of claim 1, further comprising using exteroceptive sensing to sense the contact force.

5. The method of claim 1, further comprising discontinuing the dynamic reflex when the contact force decreases below the calibrated threshold.

6. The method of claim 1, further comprising:
- automatically compensating for a gravitational force and a Coriolus force acting on the robotic manipulator in calculating the reflex torque.

7. A robotic system comprising:
- a force- or impedance-controlled robot having a robotic manipulator and an unstructured workspace, wherein the robotic manipulator includes a robotic joint that is moveable via a joint actuator; and
- a controller that is electrically connected to the robotic manipulator and adapted to control the robotic manipulator using force- or impedance-based commands;
- wherein the controller is configured to:
  - proprioceptively sense a static force applied by the robotic manipulator to its surrounding environment, and imposes a saturation limit on the static force applied by the manipulator to its surrounding environment at all times such that the static force cannot at any time exceed the saturation limit;
  - calculate a reflex torque to be imparted by the joint actuator to the robotic joint when the robotic manipulator contacts an object in the unstructured workspace; and
  - command the calculated reflex torque as a dynamic reflex of the robotic manipulator when the robotic manipulator contacts the object in the unstructured workspace with a contact force that exceeds a calibrated threshold.

8. The robotic system of claim 7, wherein the saturation limit is defined with respect to at least one of a torque in the robotic joint of the robotic manipulator, and a Cartesian force and moment on a selected point on the robotic manipulator.

9. The robotic system of claim 7, wherein the controller identifies a contact between the robotic manipulator and the object using at least one of:
- modeling of dynamics of the robotic manipulator and sensing when the contact force exceeds the calibrated threshold.

10. The robotic system of claim 7, wherein the controller automatically discontinues the dynamic reflex when the contact force decreases below the calibrated threshold.

11. A controller for a force- or impedance-controlled robot operating in an unstructured workspace and having a robotic manipulator, wherein the robotic manipulator includes a robotic joint that is moveable via a joint actuator, and wherein the controller includes a host machine that is programmed to:
- proprioceptively sense a static force applied by the robotic manipulator to its surrounding environment;
- automatically impose a saturation limit on the static force applied by the robotic manipulator to its surrounding environment at all times, such that the static force cannot at any time exceed the saturation limit;
- calculate a reflex torque to be imparted by the joint actuator to the robotic joint in the event the robotic manipulator contacts an object in the unstructured workspace; and
- command the calculated reflex torque as a dynamic reflex when the robotic manipulator contacts the object with a contact force that exceeds a calibrated threshold.

12. The controller of claim 11, wherein the saturation limit is defined with respect to at least one of a torque in the robotic joint of the robotic manipulator and a Cartesian force and moment at a selected point on the robotic manipulator.

13. The controller of claim 11, wherein the host machine is further programmed to identify contact between the robotic manipulator and the object using at least one of: modeling dynamics of the robotic manipulator and sensing when the contact force exceeds the calibrated threshold.

14. The controller of claim 11, wherein the controller discontinues the dynamic reflex when the contact force decreases below the calibrated threshold.

* * * * *